(12) United States Patent
Arndt et al.

(10) Patent No.: US 9,032,411 B2
(45) Date of Patent: May 12, 2015

(54) LOGICAL EXTENDED MAP TO DEMONSTRATE CORE ACTIVITY INCLUDING L2 AND L3 CACHE HIT AND MISS RATIO

(75) Inventors: Barry B. Arndt, Round Rock, TX (US); William M. Buros, Austin, TX (US); Jennifer L. Vargus, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 893 days.

(21) Appl. No.: 12/647,417

(22) Filed: Dec. 25, 2009

(65) Prior Publication Data

US 2011/0161969 A1 Jun. 30, 2011

(51) Int. Cl.
  *G06F 9/46* (2006.01)
  *G06F 9/48* (2006.01)

(52) U.S. Cl.
  CPC ........ *G06F 9/4881* (2013.01); *G06F 2209/483* (2013.01)

(58) Field of Classification Search
  None
  See application file for complete search history.

(56) References Cited

U.S. PATENT DOCUMENTS

| | | | |
|---|---|---|---|
| 2004/0249601 A1 | 12/2004 | Circenis | |
| 2005/0104799 A1 | 5/2005 | Shimizu | |
| 2006/0174228 A1* | 8/2006 | Radhakrishnan et al. | 717/127 |
| 2007/0150657 A1* | 6/2007 | Yigzaw et al. | 711/128 |
| 2007/0288728 A1 | 12/2007 | Tene et al. | |
| 2008/0022283 A1* | 1/2008 | Krieger et al. | 718/104 |
| 2008/0271043 A1* | 10/2008 | Kim et al. | 718/108 |

OTHER PUBLICATIONS

Siwike, CMT Utilization, see solarisinternals.com/wiki/index.php/CMT_Utilization (Aug. 4, 2006).

* cited by examiner

*Primary Examiner* — Abdullah Al Kawsar
*Assistant Examiner* — Wissam Rashid
(74) *Attorney, Agent, or Firm* — Lieberman & Brandsdorfer, LLC

(57) ABSTRACT

A computer system is provided with a processing chip having one or more processor cores, with the processing chip in communication with an operating system having kernel space and user space. Each processor core has multiple core threads to share resources of the core, with each thread managed by the operating system to function as an independent logical processor within the core. A logical extended map of the processor core is created and supported, with the map including each of the core threads indicating usage of the operating system, including user space and kernel space, and cache, memory, and non-memory. An operating system scheduling manager is provided to schedule a routine on the processor core by allocating the routine to different core threads based upon thread availability as demonstrated in the map, and thread priority.

6 Claims, 3 Drawing Sheets

LOGICAL EXTENDED MAP TO DEMONSTRATE CORE ACTIVITY INCLUDING L2 AND L3 CACHE HIT AND MISS RATIO

BACKGROUND

1. Technical Field

This relates to providing a core centric view of hardware threads and associated caches. More specifically, this relates to measuring and assessing a processor core from the perspective of individual hardware threads and stall categories.

2. Description of the Prior Art

A processor core is the processing part of a central processing unit absent the cache. The core is made up of a control unit and arithmetic logic unit. The control unit is the hardware within the processor that performs physical data transfers between memory and a peripheral device. The arithmetic logic unit is a high-speed circuit that performs calculations and comparisons. Numerical data is transferred from memory to the arithmetic logic unit for calculation, and the results can be sent back to the memory.

Multithreaded processor cores execute multiple hardware threads concurrently on a single processor core. Each processor thread is typically presented to the operating system as a hardware entity that can execute a software process or thread. The operating system is responsible for scheduling software threads for processing by the core(s) and their hardware threads. It is known in the art for operating systems to report utilization of hardware threads as central processing units.

While the use of multiple hardware threads tends to allow cores that support them to have higher total throughput per core than they would when running a single hardware thread per core, it is known that there is interference among the threads of the multi-threaded core. This interference can impact performance of the core and mitigate the benefits of the multiple threads operating on the core. Accordingly, there is a need to mitigate conflicts among the multiple threads and effectively and efficiently assign tasks to the threads in a manner that mitigates interference.

SUMMARY

This comprises a method, system, and article for understanding, measuring, managing, and controlling the states and related aspects of a multi-threaded processor core.

In one aspect, a computer system is provided with a processor core having an operating system with kernel space and user space. The processor core is also configured with multiple core threads to share resources of the core. Each thread is managed by the operating system to function as an independent logical processor within the core. A logical extended map of the processor core maps each of the core threads to indicate usage by each thread of the operating system, including user space and kernel space. In addition, the logical extended map is expanded to indicate usage by each thread of cache, memory, and non-memory. An operating system scheduling manager employs the logical extended map to schedule a routine on the processor core by allocation of the routine to different core threads based upon thread availability as demonstrated in the map.

In another aspect, a method is provided for managing a multithreaded processor core having an operating system with kernel space and user space. The processor core is also configured with multiple core threads to share resources of the core. Each thread is managed by the operating system to function as an independent logical processor within the core. Each of the core threads of the processor core is logically extended to map to indicate usage of the user space, the kernel space, cache, memory, and non-memory. A routine is scheduled on the processor core by allocating the routine to different core threads based upon thread availability as demonstrated in the map.

In yet another aspect, an article of manufacture is provided with a processor core with an operating system having kernel space and user space. The processor core has multiple core threads to share resources of the core, with each thread managed by the operating system to function as an independent logical processor within the core. The article is further provided with a computer-readable carrier including computer program instruction to manage the multithreaded processor core. Instructions are provided to logically extend a map of the core threads of the processor core to indicate usage of the user space, the kernel space, cache, memory, and non-memory. In addition, instructions are provided to schedule a routine on the processor core by allocation of the routine to different core threads based upon thread availability as demonstrated in the map Other features and advantages will become apparent from the following detailed description of the embodiments, taken in conjunction with the accompanying drawings.

BRIEF DESCRIPTION OF THE DRAWINGS

The drawings referenced herein form a part of the specification. Features shown in the drawing are meant as illustrative of only some embodiments, and not of all embodiments unless otherwise explicitly indicated. Implications to the contrary are otherwise not to be made.

DESCRIPTION OF THE PREFERRED EMBODIMENT

Figure 1:
FIG. 1 is a block diagram of a multi-threaded processor core showing the usage of threads and cache on each processor core according to the preferred embodiment, and is suggested for printing on the first page of the issued patent.

It will be readily understood that the components, as generally described and illustrated in the Figures herein, may be arranged and designed in a wide variety of different configurations. Thus, the following detailed description of the embodiments of the apparatus, system, and method, as presented in the Figures, is not intended to limit the scope of the invention, as claimed, but is merely representative of selected embodiments.

The functional units described in this specification have been labeled as managers and tools. A functional unit may be implemented in programmable hardware devices such as field programmable gate arrays, programmable array logic, programmable logic devices, or the like. The functional unit may also be implemented in software for execution by various types of processors. An identified functional unit of executable code may, for instance, comprise one or more physical or logical blocks of computer instructions which may, for instance, be organized as an object, procedure, function, or other construct. Nevertheless, the executables of an identified functional unit need not be physically located together, but may comprise disparate instructions stored in different locations which, when joined logically together, comprise the functional unit and achieve the stated purpose of the functional unit.

Indeed, a functional unit of executable code could be a single instruction, or many instructions, and may even be distributed over several different code segments, among different applications, and across several memory devices. Similarly, operational data may be identified and illustrated herein within the functional unit, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of recovery manager, authentication module, etc., to provide a thorough understanding of the embodiments. One skilled in the relevant art will recognize, however, that the invention can be practiced without one or more of the specific details, or with other methods, components, materials, etc. In other instances, well-known structures, materials, or operations are not shown or described in detail to avoid obscuring aspects.

The illustrated embodiments will be best understood by reference to the drawings, wherein like parts are designated by like numerals throughout. The following description is intended only by way of example, and simply illustrates certain selected embodiments of devices, systems, and processes that are consistent with the invention as claimed herein.

Overview

A method and system are employed to provide a core-centric view of hardware threads and associated caches of a multi-threaded processor core. The view is employed to schedule routines or modify the characteristics of the application or the operating system on different threads based upon their availability as well as based upon the priority of both the thread and the routine. Accordingly, the tools provided allow the application and system programmer access to the run-time characteristics of the application, within the operating system, on the selected hardware platform.

Technical Details

In the following description of the embodiments, reference is made to the accompanying drawings that form a part hereof, and which shows by way of illustration the specific embodiment in which the invention may be practiced. It is to be understood that other embodiments may be utilized because structural changes may be made without departing form the scope.

FIG. 1 is a block diagram (100) illustrating a map of a multi-threaded processor core showing the usage of threads and cache on each processor core. In the map shown herein, there is a single processor chip (105) having multiple cores. In one embodiment, there may be a single processor core on a single processor chip, or two or more processor cores on a single processor chip. Accordingly, the quantity of processor cores on a single processor chip should not be limited to the quantity shown herein. As shown in this example, there are eight processor cores on a single processor chip: $core_0$ (110), $core_1$ (120), $core_2$ (130), $core_3$ (140), $core_4$ (150), $core_5$ (160), $core_6$ (170), and $core_7$ (180) shown herein on the single processor chip (105). Each of the processor cores is multi-threaded. In the map shown herein, there are four processor threads (190), (192), (194), and (196) for each processor core. In one embodiment, there may be a single thread on one or more of the processor cores, or two or more threads on one or more of the processor cores. Accordingly, the quantity of threads per processor core on a single processor chip should not be limited to the quantity shown herein.

Each of the threads of each core is designed and configured to share resources of the processor core. As shown herein, each thread also utilizes operating system resources. More specifically, each thread utilizes operating system user space and kernel space. In addition, each thread utilizes cache, memory, and other system resources as needed by the run-time characteristics of the application and the system. Each of the elements utilized by each thread is employed in the map. As shown in the map (100), usage of system resources is shown for each processor core. More specifically, processor $core_0$ (110) is shown with usage of the user space (102), the kernel space (104), memory (106), and non-memory (108) of the single processor chip (105). Similarly, usage of each of processor $core_1$ (120), processor $core_2$ (130), processor $core_3$ (140), processor $core_4$ (150), processor $core_5$ (160), processor $core_6$ (170), and processor $core_7$ (180) are shown mapped to the user space (102), the kernel space (104), memory (106), and non-memory (108) of the single processor chip (105). Accordingly, the map delineates sharing of the operating system resources by each of the threads in the multi-core processor.

As noted above, the map (100) is expanded to illustrate sharing of the operating system resources utilized by both the L2 cache (176) and the L3 cache (186). As known in the art, L2 cache is a memory bank built into the processor chip. The L2 cache feeds the L1 cache, which feeds the processor. Similarly, L3 cache is a memory bank built within or physically close to the processing chip. The L3 cache feeds the L2 cache, which feeds the L1 cache, which feeds the processor. In general, the L2 and L3 cache are faster and spatially closer than main memory and allow instructions to be executed and data to be read and written at a higher speed than supported with main memory. Each of the processor cores utilizes L2 and when available an L3 cache. As shown in the map (100), usage of both the L2 and L3 cache is reflected in the respective cache hit and miss ratio shown for each processor core. More specifically, processor $core_0$ (110) is shown with the L2 cache hit and miss ratios (112) and (114), respectively; processor $core_1$ (120) is shown with the L2 cache hit and miss ratios (122) and (124), respectively; processor $core_2$ (130) is shown with the L2 cache hit and miss ratios (132) and (134), respectively; processor $core_3$ (140) is shown with the L2 cache hit and miss ratios (142) and (144), respectively; processor $core_4$ (150) is shown with the L2 cache hit and miss ratios (152) and (154), respectively; processor $core_5$ (160) is shown with the L2 cache hit and miss ratios (162) and (164), respectively; processor $core_6$ (170) is shown with the L2 cache hit and miss ratios (172) and (174), respectively; and processor $core_7$ (180) is shown with the L2 cache hit and miss ratios (176) and (186), respectively. As shown herein, the hardware view of the processor core is expanded beyond the multi-threaded implementations to include both the L2 and L3 cache hit and miss ratio for each processor core. Accordingly, by understanding the run-time characteristics of the L2 and L3 cache hits and misses, the operating system and processor cores can be managed more effectively with scheduler, tuning, or even returning to improved compilation techniques.

The mapping of the multi-threaded processor core as shown in FIG. 1 exposes the processor chip usage in terms of the underlying core technology. This mapping is known herein as an extended logical mapping that provides a view of the usage of the user space, kernel space, memory, and non-memory, by each thread of each processor core, while also demonstrating the L2 and L3 cache hit and miss ratios for each processor core. More specifically, this extended logical mapping provides a whole core usage perspective. Data from the extended logical mapping can be utilized to efficiently schedule and allocated tasks to different threads of the different cores. Not all threads are equal, in that different threads may have different priorities assigned thereto, and some threads may not have equal access to the underlying core resources. In one embodiment, the hardware may be biased to assign certain tasks to specific thread. A scheduler may utilize the extended logical mapping of the processor core to schedule tasks on different threads depending upon both the availability and the priority of the thread.

Figure 2:
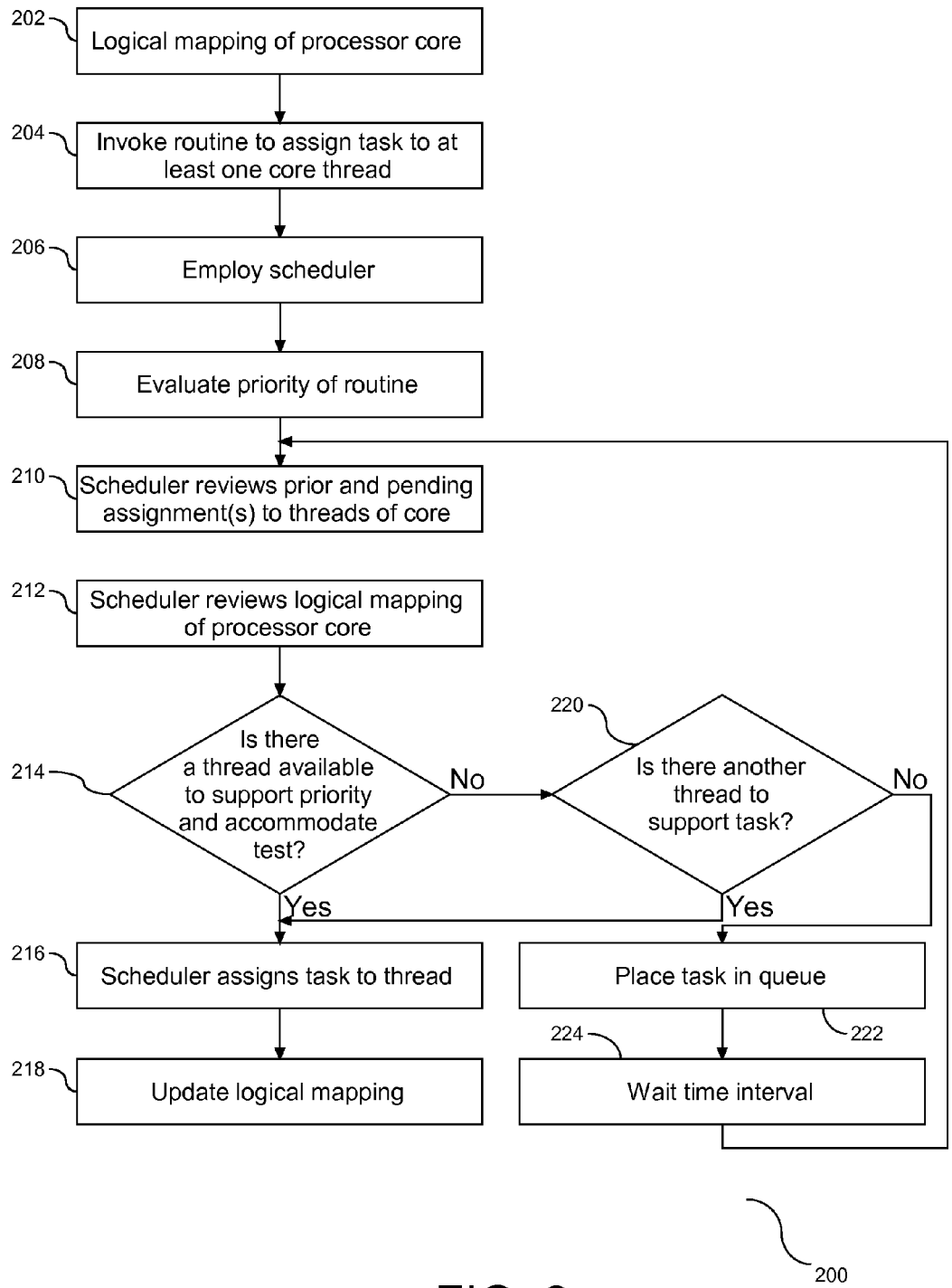
FIG. 2 is a flow chart illustrating a process for assigning one or more tasks to a thread of a processor core.

FIG. 2 is a flow chart (200) illustrating a process for assigning one or more tasks to a thread of a processor core. As reflected in FIG. 1, a logical extended mapping of the processor core is provided (202). This mapping is dynamic in that it reflects the ongoing actions of the threads and L2 and L3 cache in each processor core for each central processing unit chip, also known as a socket. In one embodiment, each of the threads on each core functions as a logical processor. Based upon the logical extended mapping of the threads, a routine is invoked to assign a task to at least one of the core threads (204). The routine employs a scheduler (206) which evaluates the priority of the routine (208). At the same time, the scheduler reviews prior and pending assignments to the threads of the core (210), as well as the logical extended mapping for the processor core to get a vision of the core activity (212). Following the review by the scheduler, it is determined if there is an available thread on the processor core that can support a priority to accommodate the tasks (214). A positive response to the determination at step (214) is followed by the scheduler assigning the task to the available thread (216) and an update of the logical extended mapping (218). Conversely, following a negative response to the determination at step (214), it is determined if there is another thread on the same processor core or a different processor core that can support the task (220). A positive response to the determination at step (220) is followed by a return to step (216). Conversely, a negative response to the determination at step (220) is followed by placement of the task in a queue (222). Following a set duration (224), the process returns to step (210) for review of the non-assigned task by the scheduler. Accordingly, a scheduler is employed to leverage the logical extended mapping of the threads to appropriately assign tasks to the different threads of the processor core responsive to the priority of the routine as well as the usage of the threads as demonstrated in the mapping.

Figure 3:
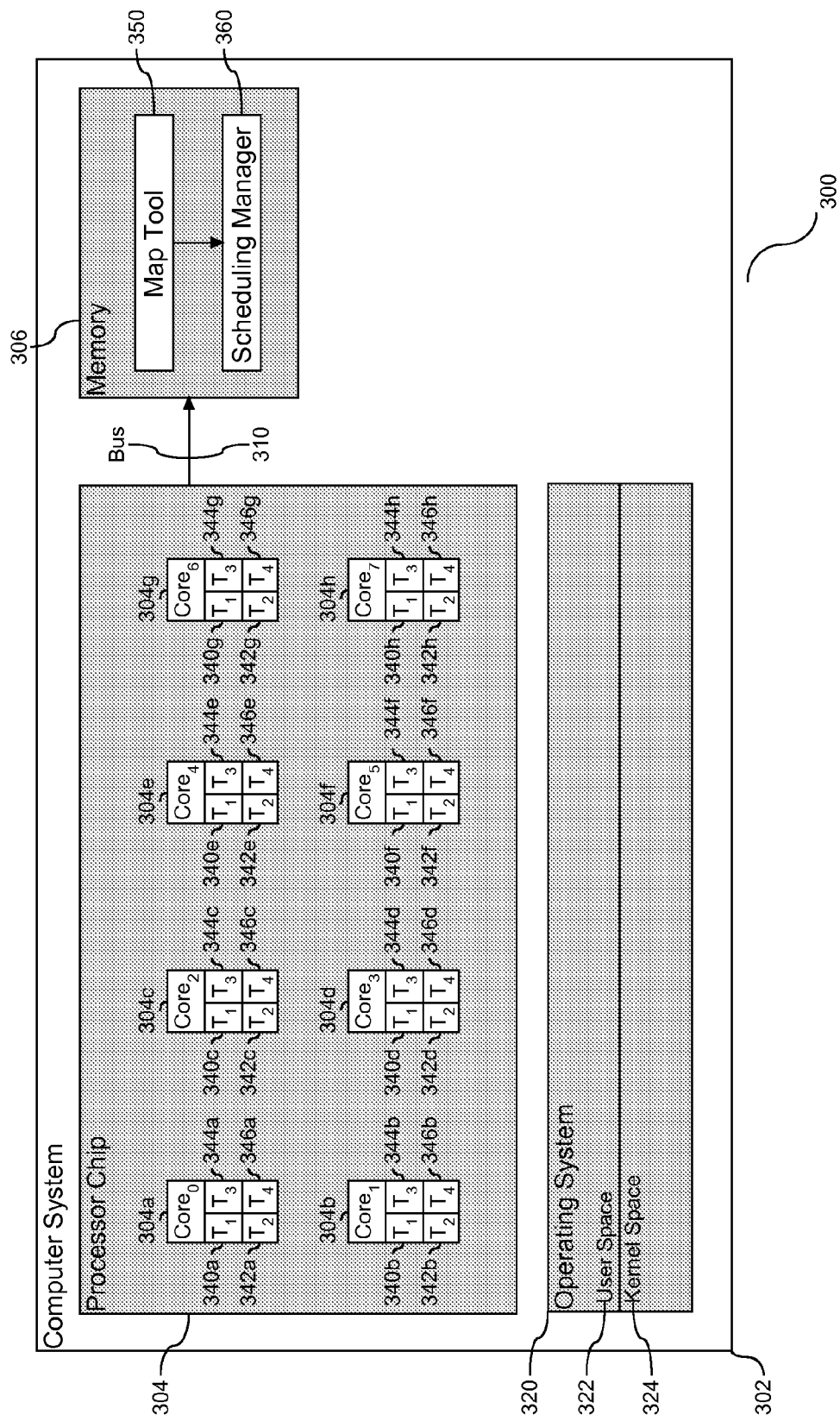
FIG. 3 is a block diagram illustrating a set of tools for monitoring the activity of the processor core, including a scheduler to assign tasks to threads to support efficient and appropriate use of the logical processors of the core.

As shown in FIGS. 1 and 2, the activity of the different threads of the processor core are mapped and leveraged for assignment of tasks to the threads. FIG. 3 is a block diagram (300) illustrating a set of tools for monitoring the activity of the processor core, including the logical processors therein as well as the L2 and L3 hit and miss ratios, and a scheduler to assign tasks to threads to support efficient and appropriate use of the logical processors of the core. As shown, a computer system (302) is provided with a processor chip (304) in communication with the operating system (320), having kernel space (322) and user space (324), and coupled to memory (306) by a bus structure (310). Although only one processor chip (304) is shown, in one embodiment, more processor chips may be provided in an expanded design. The processor chip (304) is shown having multiple cores, with each core including multiple hardware threads to share resources of the core. In one embodiment, each thread is managed by the operating system (320) to function as an independent logical processor within the core. As shown herein, processor chip (304) has eight cores (304a), (304b), (304c), (304d), (304e), (304f), (304g), and (304h), with each core having four hardware threads. More specifically, core (304a) has hardware threads (340a), (342a), (344a), and (346a); core (304b) has hardware threads (340b), (342b), (344b), and (346b); core (304c) has hardware threads (340c), (342c), (344c), and (346c); core (304d) has hardware threads (340d), (342d), (344d), and (346d); core (304e) has hardware threads (340e), (342e), (344e), and (346e); core (3040 has hardware threads (340f), (3420, (3440, and (3460; core (304g) has hardware threads (340g), (342g), (344g), and (346g); and core (304h) has hardware threads (340h), (342h), (344h), and (346h). In one embodiment, the processor chip (304) may be designed with a different quantity of cores, and/or a different quantity of threads per core. Accordingly, the invention should not be limited to the processor core (304) with the quantity of hardware threads shown herein.

The system (302) is further configured with a set of tools to manage allocation of tasks within each core. A map tool (350) is provided to organize and communicate a map of the processor core, including a usage map of the logical threads within each processor core. The map includes each of the core threads, with each core thread indicating usage of the operating system, including user space and kernel space, and cache, memory, and non-memory. In addition, a scheduling manager (360) is provided to schedule a routine on the processor core. The scheduling manager is responsible for allocation of the routine to different core threads based upon thread availability as demonstrated in the map maintained by the map tool (350). In one embodiment, the map is retained as part of the user space memory (306). Each core thread has an assigned priority, and the scheduling manager (360) is employed to schedule the routine on at least one of the threads based upon a priority of the routine and the assigned priority of the thread. In one embodiment, the scheduling manager (360) employs the map tool (350) to evaluate usage of the logical processors on the core and to determine assignment of a routine to one or more logical processors based upon the usage conveyed in the map. The map tool (350) and the scheduling manager (360) are shown local to memory (306). However, the invention should not be limited to this embodiment. For example, in one embodiment, the map tool (350) and/or the scheduling manager (360) may reside as hardware tools external to local memory (306), they may reside local to the operating system (320), or they may be implemented as a combination of hardware and software. Similarly, in one embodiment, the map tool (350) and scheduling manager (360) may reside on a remote system in communication with the processor chip (304). Accordingly, the tool and manager may be implemented as a software tool or a hardware tool to manage logical processors within one or more processor cores of a processor chip, and more specifically, to schedule routines on the processor cores responsive to usage thereof by other routines.

In one embodiment, the tool and/or manager is implemented in software, which includes but is not limited to firmware, resident software, microcode, etc. The software implementation can take the form of a computer program product accessible from a computer-useable or computer-readable medium providing program code for use by or in connection with a computer or any instruction execution system. This can take the form of a computer program product accessible from a computer usable or computer readable medium providing program code for use by or in connection with a computer or any instruction execution system. For the purposes of this description, a computer usable or computer readable medium can be any apparatus that can store the program for use by or in connection with the instruction execution system, apparatus, or device. The computer-readable medium does not include propagated or transitory signals.

Embodiments within the scope also include articles of manufacture comprising program storage means having encoded therein program code. Such program storage means can be any available media which can be accessed by a general purpose or special purpose computer. By way of example, and not limitation, such program storage means can include RAM, ROM, EEPROM, CD-ROM, or other optical disk storage, magnetic disk storage or other magnetic storage devices, or any other medium which can be used to store the desired program code means and which can be accessed by a general purpose or special purpose computer. Combinations of the above should also be included in the scope of the program storage means.

Examples of a computer-readable medium include a semiconductor or solid state memory, magnetic tape, a removable computer diskette, random access memory (RAM), read-only memory (ROM), a rigid magnetic disk, and an optical disk. Current examples of optical disks include compact disk B read only (CD-ROM), compact disk B read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks.

Advantages Over the Prior Art

The map of the processor core(s) with the logical processors provides a view of the activity of the threads on the processor core, as opposed to a view of the processor activity for the operating system. More specifically, the mapping created by the map tool is a new approach to viewing threaded processing on the processor cores. Different tasks can be allocated to different threads based upon availability of the threads, as well as the ability of the threads. Not all threads are equal, and at the same time, not all threads are readily available. The scheduler is configured to employ the map of the processor core to assign different tasks to different threads depending on both availability and priority of the threads. Accordingly, performance counter metrics are extended to encapsulate the execution characteristics of the scheduling decisions being made.

ALTERNATIVE EMBODIMENTS

It will be appreciated that, although specific embodiments have been described herein for purposes of illustration, various modifications may be made without departing from the spirit and scope. In particular, a routine may be invoked to show the map of the processor core(s) at periodic intervals. Similarly, the map may be employed to produce a graphical image of the usage of the threads to further describe the assignment of tasks of a routine to specific threads. Although a scheduler is employed to assign tasks to logical processors, an administrator may over ride the scheduler for task assignment. Furthermore, in one embodiment, the logical extended map is expanded to indicate non-uniform memory architecture (NUMA mapping), including usage by each thread of cache, memory, and non-memory. Similarly, in another aspect the hardware capabilities and usage of the associated processor and care caches, both local and nearby, are tied together. The metrics provided by seeing these counters in use provides an enhanced understanding of the operation of the processor core and enables the application programmer with improved information to present to the end user. Accordingly, the scope of protection is limited only by the following claims and their equivalents.

We claim:
1. A computer system comprising:
a processor core with an operating system, the operating system having kernel space and user space;
the processor core having multiple core threads to share resources of the core, with each core thread managed by the operating system to function as an independent logical processor within the core;
a logical extended map of the processor core, the map to indicate a hit and miss ratio of L2 and L3 cache to demonstrate core activity of the logical processor within the processor core, and for each core thread the usage of the operating system resources, including user space and kernel space, and memory; and
an operating system scheduling manager to schedule a routine on the processor core by allocation of the routine to different core threads on an inter-core basis based upon routine priority, thread priority, and thread availability for each core thread, with thread availability demonstrated by the map.

2. The system of claim 1, further comprising each core thread to include an assigned priority, and the operating system scheduling manager to schedule the routine on at least one of the threads based upon a priority of the routine and the assigned priority of the thread.

3. A method for managing a multithreaded processor core, comprising:
a processor core with an operating system, the operating system having kernel space and user space;
the processor core having multiple core threads to share resources of the core, with each core thread managed by the operating system to function as an independent logical processor within the core;
a logically extended map to indicate a hit and miss ratio of L2 and L3 cache to demonstrate core activity of the logical processor within the processor core, and the usage of the user space, kernel space, and memory for each core thread; and scheduling a routine on the processor core by allocation of the routine to different core threads on an inter-core basis based upon routine priority, thread priority, and thread availability for each core thread, with thread availability demonstrated by the map.

4. The method of claim 3, further comprising each core thread including an assigned priority, and scheduling the routine on at least one of the threads based upon a priority of the routine and the assigned priority of the thread.

5. An article comprising:

a processor core with an operating system, the operating system having kernel space and user space, and the processor core having multiple core threads to share resources of the core, with each core thread managed by the operating system to function as an independent logical processor within the core;

a computer-readable medium including computer program instructions to manage the multithreaded processor core, the instructions comprising:

instructions to logically extend a map of the processor core, the map to indicate a hit and miss ratio of L2 and L3 cache to demonstrate core activity of the logical processor within the processor core, and for each core thread the usage of the user space and kernel space, and memory; and instructions to schedule a routine on the processor core by allocation of the routine to different core threads on an inter-core basis based upon routine priority, thread priority, and thread availability for each core thread, with thread availability demonstrated by the map.

6. The article of claim 5, further comprising each core thread including an assigned priority, and instructions to schedule the routine on at least one of the threads based upon a priority of the routine and the assigned priority of the thread.

* * * * *